United States Patent [19]

Wortham

[11] Patent Number: 4,779,006
[45] Date of Patent: Oct. 18, 1988

[54] HYBRID SOLAR-WIND ENERGY CONVERSION SYSTEM

[76] Inventor: Melvin Wortham, 1404 W. Harrison St, Apt. 1B, Chicago, Ill. 60607

[21] Appl. No.: 66,037

[22] Filed: Jun. 24, 1987

[51] Int. Cl.$^4$ .......................... H02P 9/04; F03G 7/02
[52] U.S. Cl. ........................................ 290/55; 290/44; 60/641.12; 415/2 A
[58] Field of Search ...................... 290/55, 44, 54, 43; 60/641.8, 641.11, 641.12, 641.13, 641.14, 641.15, 659; 323/906; 415/2 A, 3

[56] References Cited

U.S. PATENT DOCUMENTS

| | | | |
|---|---|---|---|
| 3,936,652 | 2/1976 | Levine | 290/55 X |
| 4,018,543 | 4/1977 | Carson et al. | 290/55 X |
| 4,096,698 | 6/1978 | Martin | 60/641.12 |
| 4,275,309 | 6/1981 | Lucier | 290/55 X |
| 4,388,533 | 6/1983 | Campbell et al. | 290/55 X |
| 4,452,046 | 6/1984 | Valentin | 290/55 X |
| 4,475,342 | 10/1984 | Assaf | 60/641.12 X |
| 4,491,740 | 1/1985 | Siegel | 290/55 |

*Primary Examiner*—William M. Shoop, Jr.
*Assistant Examiner*—Sharon D. Logan
*Attorney, Agent, or Firm*—Wood, Dalton, Phillips, Mason & Rowe

[57] ABSTRACT

A system for producing electrical energy including a stack shaped and positioned generally as the letter "J" and having an intake portion, an exhaust portion and a conveying portion therebetween together with a vacuum producing mechanism associated with the exhaust portion for causing air to move through the stack whereby a generator responsive to the moving air generates electricity.

22 Claims, 9 Drawing Sheets

FIG. 12 WIND CUPS

FIG. 11 SAVONIUS

FIG. 10 EXHAUST FAN

FIG. 13 DARRIEUS

HYBRID SOLAR-WIND ENERGY CONVERSION SYSTEM

FIELD OF THE INVENTION

The present invention relates to a system for producing electrical energy and more particularly to a system for converting solar and wind energy into electrical energy.

BACKGROUND OF THE INVENTION

Due to unstable political climates of many of the world's petroleum producing nations, it has become apparent that a consistent production of petroleum cannot be relied upon. Further, it has also become increasingly apparent that the earth has only a finite supply of petroleum, estimates indicating that the supply will become exhausted early in the twenty first century. Nuclear energy is experiencing ever increasing public opposition, and generation of electricity from coal has been linked to acid rain. Therefore, it has become necessary to develop alternate systems for producing electricity.

The sun generates a relatively infinite amount of solar energy which is constantly directed towards the earth. The problem to date in harnessing the solar energy has been an inability to convert significant amount of the solar energy to usable electrical energy at a competitive price. Of course, the wind also provides a previously unharnessed source of wind energy which has been recognized as potentially beneficial.

SUMMARY OF THE INVENTION

In accordance with the present invention a system for producing electrical energy comprises a stack, shaped and positioned so as to be generally "J" shaped, and having an intake portion, an exhaust portion and a conveying portion therebetween, together with means for causing air to move through the stack and means responsive to the moving air for generating electricity.

More specifically, the system includes a generator fan coupled to an armature shaft of an electrical generator and mounted within the intake portion of the stack. A solar reflector directs solar energy towards a heat engine located at the exhaust portion of the stack, the heat engine thereby causing air to exhaust upwardly from the exhaust portion of the stack. As the exhausting air is exhausted from the stack, a partial vacuum is developed within the stack. Air is drawn into the intake portion of the stack and moves across blades of the generator fan as a result of the partial vacuum. The moving air rotates the generator fan, turning the armature shaft of the electrical generator and thereby producing electrical energy.

Various heat engines are contemplated for exhausting the air from the exhaust portion of the stack.

In a first embodiment of the present invention, the exhaust portion of the stack is painted black. The black exhaust portion absorbs the directed solar energy, heating the air within. The heated air rises out of the exhaust portion of the stack, thereby drawing air into the intake portion of the stack.

In a second embodiment of the present invention, the heat engine comprises a Stirling engine mounted within the exhaust portion of the stack. The Stirling engine is connected to an exhaust fan mounted within the exhaust portion of the stack. The directed solar energy drives the Stirling engine, causing rotation of the exhaust fan and, hence, exhausting air from the exhaust portion of the stack.

In a third embodiment of the present invention, a solar activated bypass axial flow turbo jet engine is mounted within the exhaust portion of the stack. The directed solar energy heats air which passes over blades of the turbo jet engine, causing the turbo jet engine to rotate, functioning as an exhaust fan to exhaust air from the exhaust portion of the stack.

The instantaneous level of solar energy varies due to such factors as clouds. To maintain a relatively constant speed of rotation of the exhaust fan, and, hence, a relatively constant rate of air movement and rotation of the generator fan as the solar energy level varies, a variable mass flywheel is coupled to the exhaust fan and is used to alternately store and utilize rotational energy.

Various wind driven fans are contemplated which are mounted external to the exhaust portion of the stack and are connected to exhaust fans, the wind driven fans utilizing wind energy to further facilitate the exhausting of the air from the stack.

To multiply the air flow across the generator fan, a plurality of exhaust portions can be ganged together by a common manifold to a single intake portion.

BRIEF DESCRIPTION OF THE DRAWINGS

Other features and advantages of the invention will be apparent from the following description taken in connection with the drawings, wherein.

DETAILED DESCRIPTION OF THE PREFERRED EMBODIMENTS

Figure 1:
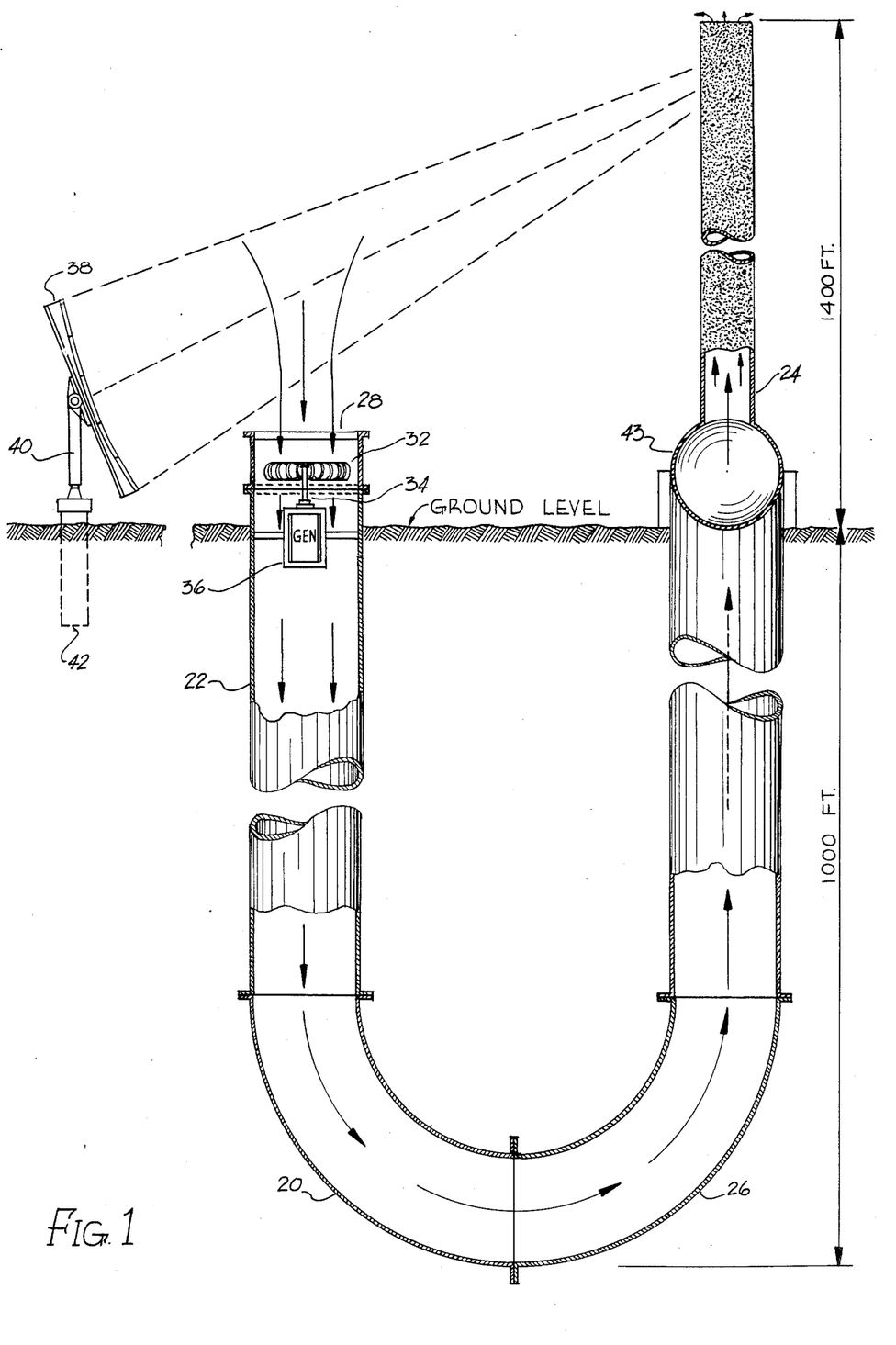
FIG. 1 is an elevation in partial section of a first embodiment of the present invention.

A first embodiment of a solar-wind energy conversion system, hereinafter simply referred to as a "generating system", is illustrated in FIG. 1.

A tubular stack, generally designated 20, is shaped so as to be generally "J" shaped and has an intake portion generally designated 22, an exhaust portion generally designated 24 and a conveying portion generally designated 26. The stack 20 further includes an intake opening 28 and an exhaust opening 30. The stack is approximately 2,400 feet high and is buried in the ground approximately 1,000 feet. As will thus be appreciated, the the exhaust opening 30 is located approximately 1,400 feet above ground level, and the intake opening 28 is just slightly above ground level.

A generator fan 32 is located within the intake portion 22, near the intake opening 28 and is connected by an armature shaft 34 to an electrical generator 36.

A solar reflector 38 is pivotably mounted to a reflector support 40 so as to be rotatable on a footing 42. The solar reflector 38 is positioned such that solar energy received from the sun (not shown) is focused upon the exhaust portion 24.

A manifold 43 can be incorporated to interconnect a plurality of exhaust portions 24 to single intake portion 22, as is discussed in greater detail below (see, e.g., FIGS. 6 and 7).

In operation of the generating system disclosed in FIG. 1, the solar energy from the sun is focused by the solar reflector 38 upon the exhaust portion 24. In this first embodiment, the exhaust portion 24 is painted black to provide a substantially dark surface permitting the exhaust portion to and operate as a heat engine. The black exhaust portion 24 absorbs the directed solar energy, causing air within the exhaust portion 24 to heat and rise. As the heated air rises and exhausts through the exhaust opening 30, a partial vacuum is formed within the stack 20, drawing air into the intake portion 22 via the intake opening 28. The air entering the intake portion 22 then passes over the generator fan 32 causing it to rotate. Rotation of the generator fan 32 rotates the armature shaft 34 of the generator 36. As is well known in the art, rotation of the armature shaft 34 causes the generator 36 to generate electricity.

Figures 2, 3, 4:
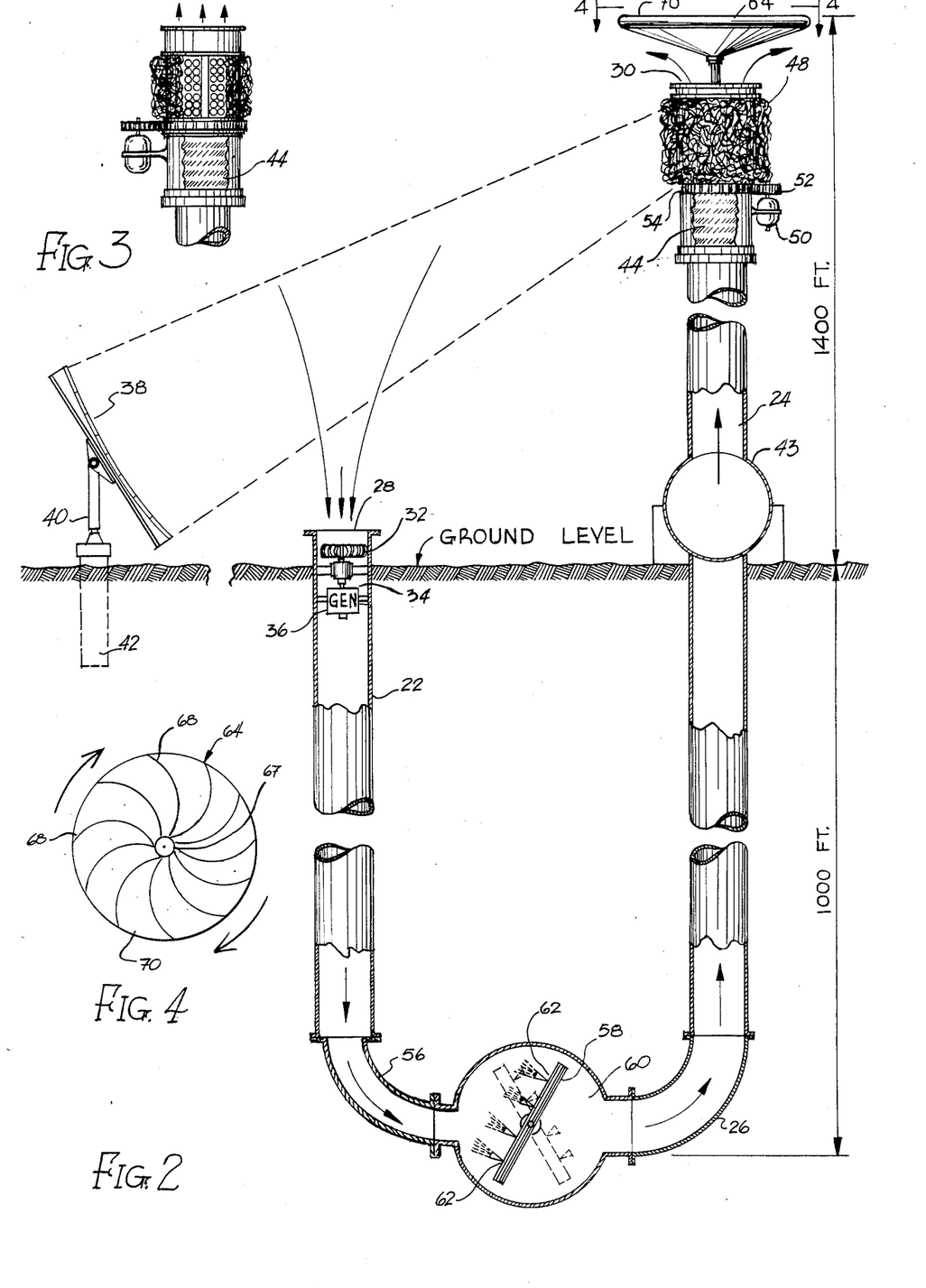
FIG. 2 is an elevation in partial section of a second embodiment of the present invention.
FIG. 3 is a fragmentary elevation in partial section of a heat engine utilized in the embodiment illustrated in FIG. 2.
FIG. 4 is a partial plan view taken along line 4—4 of FIG. 2.

A second embodiment of the generating system is illustrates in FIG. 2.

In the second embodiment, the heat engine comprises a solar activated bypass axial flow turbo jet engine 44 which exhausts air form the stack 20. A heat transfer and distribution blanket 48 is mounted exteriorly to and in close, sliding contact with the exhaust portion 24 near the exhaust opening 30. The heat transfer and distribution blanket 48 is driven by a distribution motor 50 through gears 52, 54 so as to rotate axially about the exhaust portion 24 for evenly distributing solar energy entirely about the exhaust portion 24.

The turbo jet engine 44 is specifically illustrated in FIG. 3. The focused solar energy causes the air within the exhaust portion 24 to heat, rise and pass through the turbo jet engine 44. The rising air causes the turbo jet engine 44 to rotate, exhausting air from the exhaust portion 24, thereby creating a partial vacuum within the stack 20 and drawing air into the intake portion 22 and across the generator fan 32. Rotation of the generator fan 32 again produces electricity by causing rotation of the armature shaft 34 of generator 36.

Referring to FIG. 2, a restricted section 56 has a diameter less than the diameter of the intake portion 22. Following the restricted section is a sprayer 58 mounted within an expansion chamber 650. After the air passes over the generator fan 32 it is channeled down the input portion 22 into the restriction section 56.

As the air enters the restricted section 56, the air is compressed and heated, enhancing the capability of the generating system to exhaust the air. The compressed and heated air then enters the expansion chamber 60, causing the pressure of the compressed and heated air to drop while a heated, atomized mist is injected into the air in the expansion chamber 60 from atomizing heads 62 of the sprayer 58. The injected mist increases the energy and buoyancy of the air, further enhancing the efficiency of the system because the heated, moist air is lighter and more buoyant than dry, cooler air.

To maintain a relatively constant angular velocity of the turbo jet engine 44 during varying levels of solar energy, a variable mass flywheel 64 is coupled to the turbo engine 44. The flywheel 64 is funnel shaped and includes means (not shown) for injecting a fluid, such as water, therein to vary its mass. The flywheel 64 is void of fluid as the turbo jet engine 44 is initially brought up to operating speed. After the flywheel 64 reaches its operating speed, the momentum of the flywheel is gradually increased by injecting fluid from a reservoir (not shown) through a hollow center hub 67 into compartments formed by baffles 68 (see FIG. 4) which spiral out from the center hub 67 to an outer perimeter wall 70. The fluid is added gradually to the flywheel 64 so as to not to bog down the turbo jet engine 44. The fluid is held in place along the perimeter wall 70 by centrifugal force until the solar energy level is reduced. Upon reduction of the solar energy level, the increased mass of the flywheel 64 will tend to cause the turbo jet engine 44 to coast at or about its operating speed. As the turbo jet engine 44 slows down, some of the fluid will drain back to the reservoir, gradually reducing the angular momentum of the flywheel 64 while maintaining its angular velocity.

Figure 5:
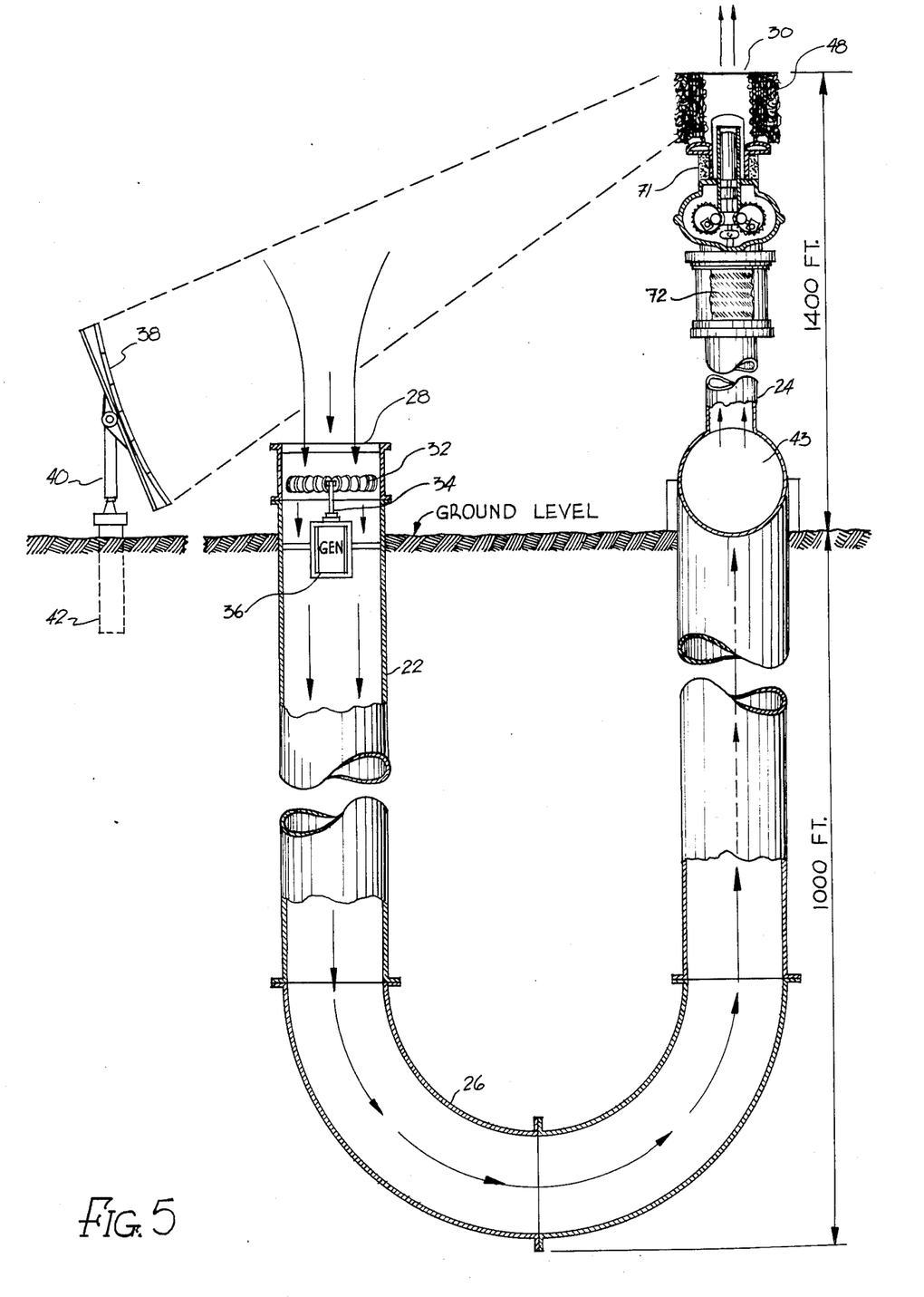
FIG. 5 is an elevation in partial section of a third embodiment of the present invention.

A third embodiment of the present invention utilizing a Stirling engine 71 driving an exhaust fan 72 as a heat engine is illustrated in FIG. 5. The Stirling engine 71 is a well known engine which operates according to the Stirling cycle. Further information regarding the Stirling engine and the Stirling cycle can be found in T. Baumeister, Marks' Standard Handbook for Mechanical Engineers, (8th ed. 1978).

The flywheel 64 discussed above can be used in conjunction with this third embodiment, too.

Figure 6:
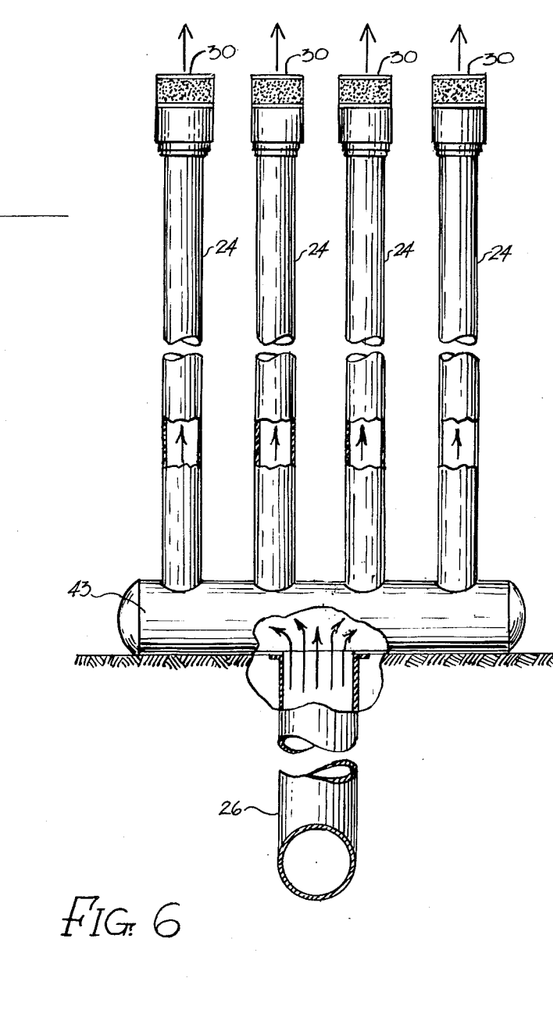
FIG. 6 is an elevation illustrating the present invention, broken away to show direction of air flow.
Figure 7:
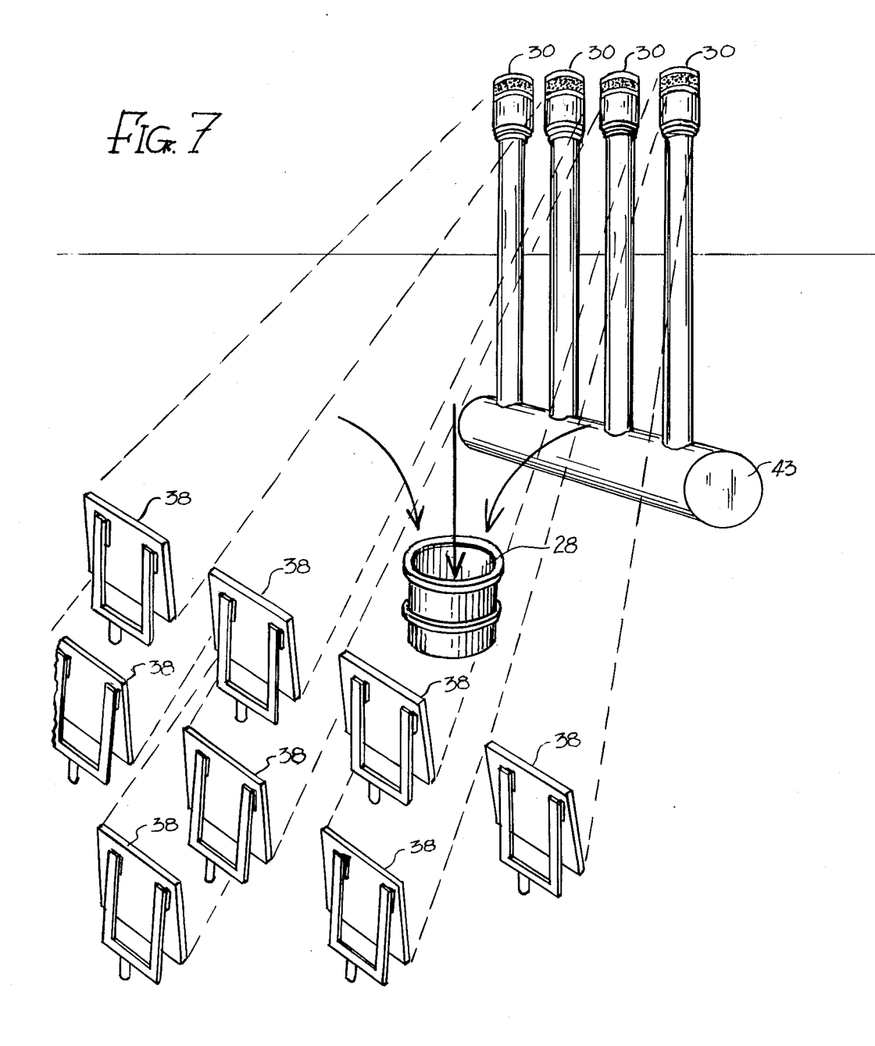
FIG. 7 is a perspective view of the present invention.

Referring to FIGS. 6 and 7, a generating system comprising four exhaust portions 24 coupled by the manifold 43 to a single intake portion 22 is illustrated. By ganging together a plurality of exhaust portions 24, the air volume and velocity of air drawn through the single intake portion 22, and hence across the generator fan 32, is multiplied, thereby significantly increasing the electrical generation capacity of the generating system. FIG. 7 illustrates a plurality of solar reflectance 38 utilized to increase the amount of solar energy directed towards the exhaust portions 24.

Figure 8:
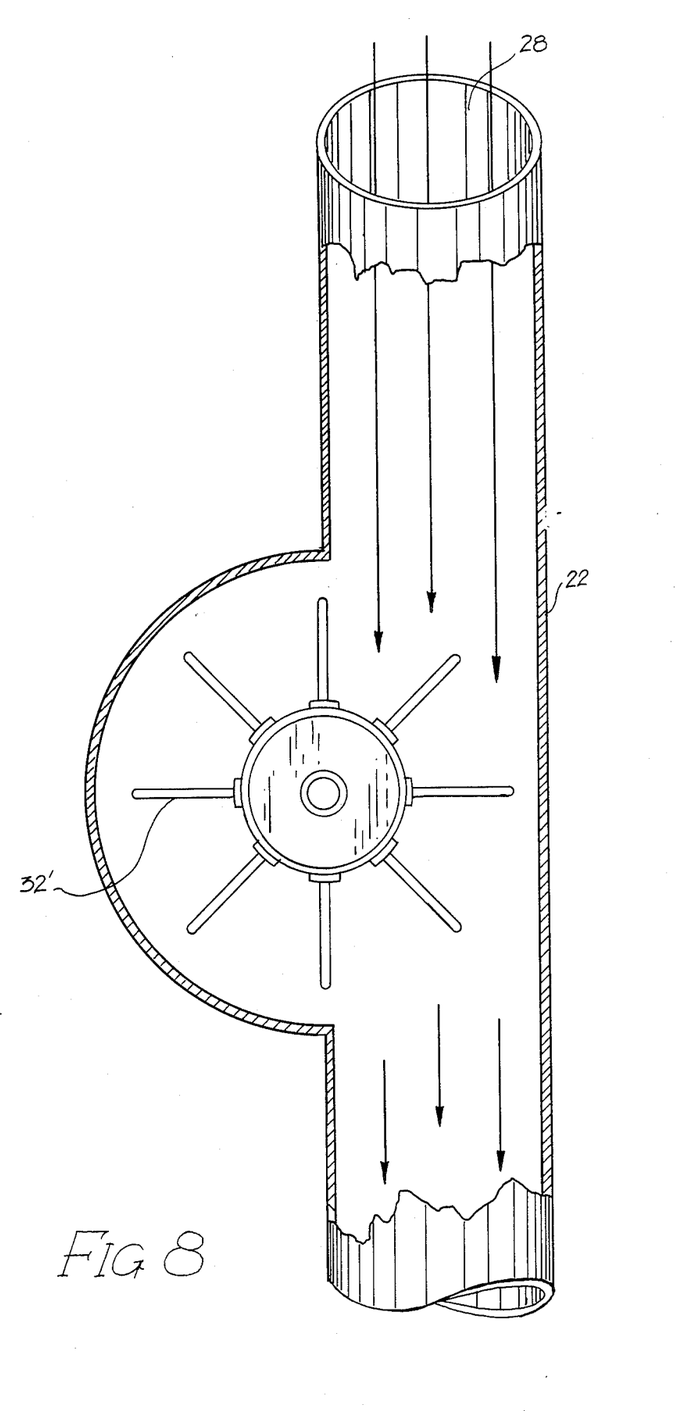
FIG. 8 is an enlarged fragmentary sectional view illustrating an alternative generator fan.

FIG. 8 illustrates an alternative generator fan 32' mounted in the intake portion 22.

Figure 9:
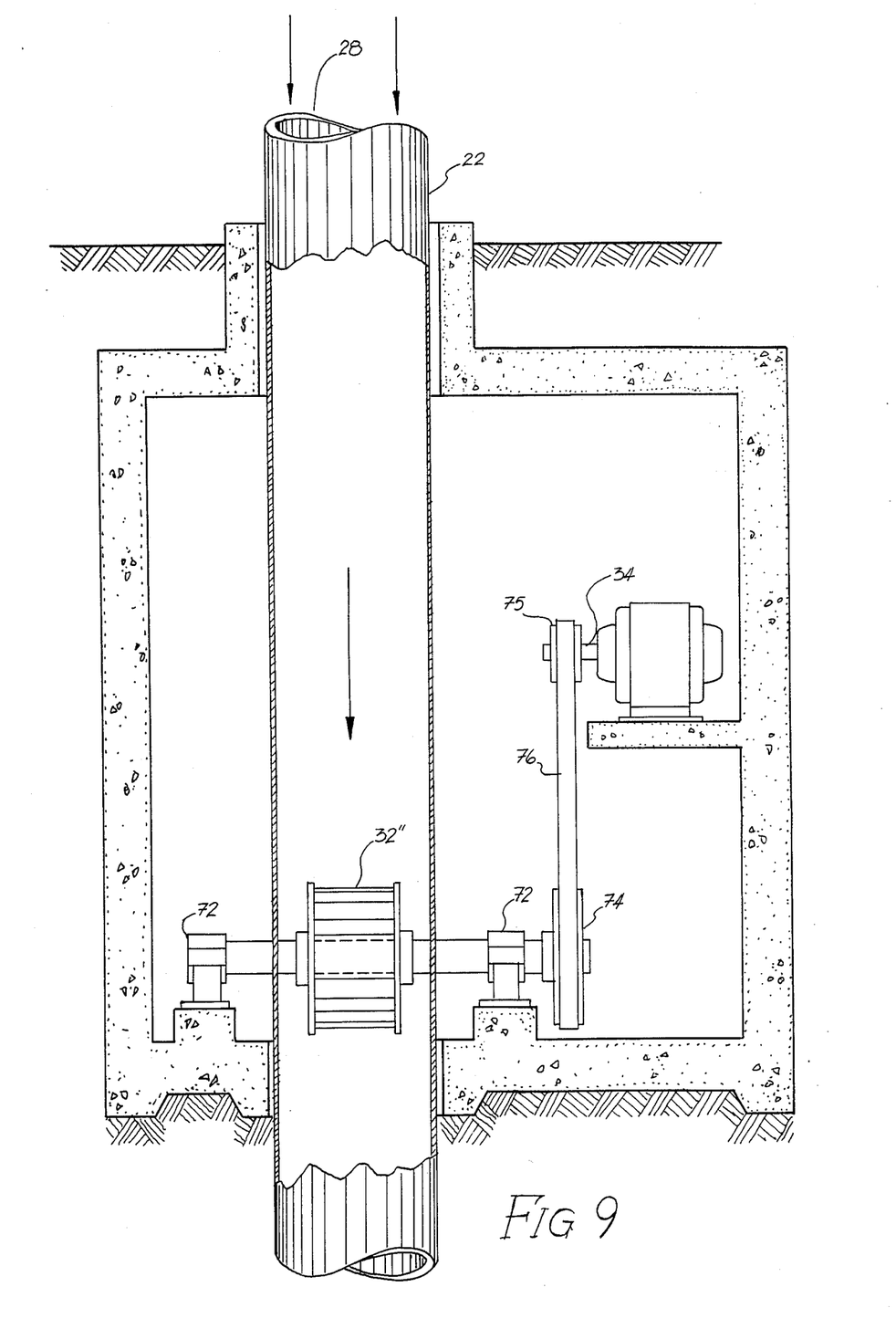
FIG. 9 is an enlarged fragmentary sectional view illustrating still another embodiment of a generator fan and generator.

FIG. 9 illustrates still another alternative generator fan 32". The generator fan 32" is supported by bearings 72 and coupled to the armature shaft 34 by pulleys 74, 75 and a drive belt 76. The generator fan 32" illustrated in FIG. 9 is a squirrel-cage type.

FIGS. 10–13 illustrate various wind driven fans which can be utilized in addition to the solar powered exhaust systems to aid in exhausting air from the exhaust portion 24.

Figure 10:
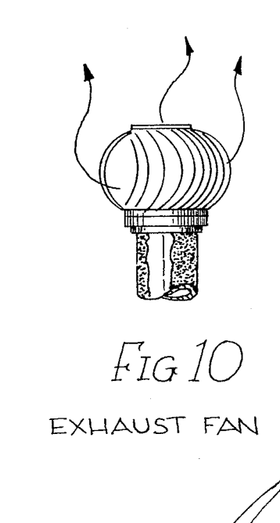
FIGS. 10–13 illustrate various embodiments of wind driven fans.

FIG. 10 illustrates an exhaust turbine 80 which is mounted to the exhaust portion 24 immediately above the exhaust opening 30. The wind causes the exhaust turbine 80 to rotate, which creates a draft to aid in exhausting air from the exhaust portion 24.

Figure 11:
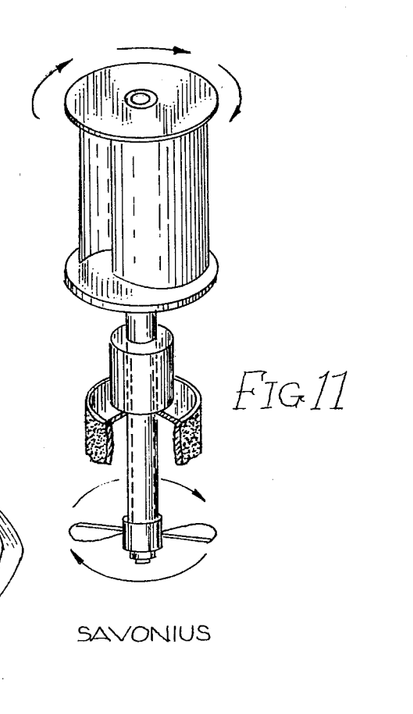

A Savonius fan 82 connected to a wind driven exhaust fan 83 is illustrated in FIG. 11. The wind driven exhaust fan 83 is located in the exhaust portion 24.

Figure 12:
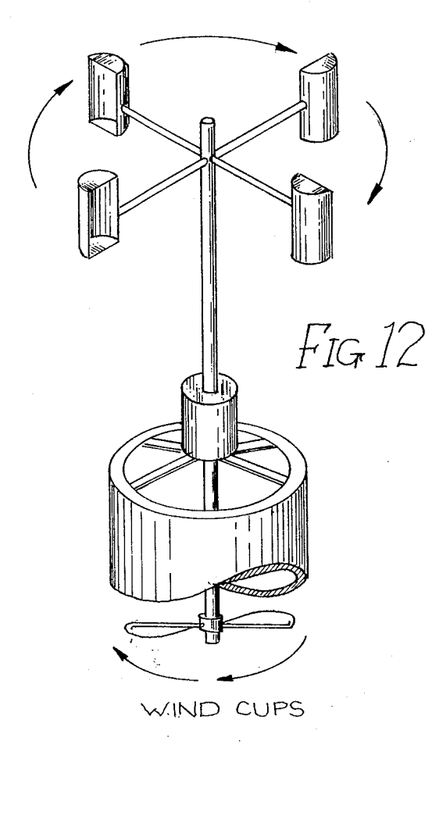

FIG. 12 illustrates wind cups 84 coupled via a wind cup shaft 85 to the wind driven exhaust fan 83.

Figure 13:
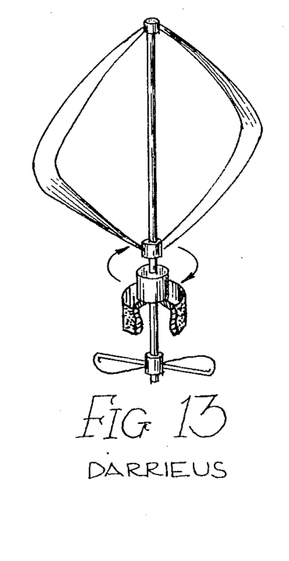

FIG. 13 illustrates a Darrieus fan 87 coupled by a Darrieus fan shaft 89 to the wind driven exhaust fan 83.

Figure 14:
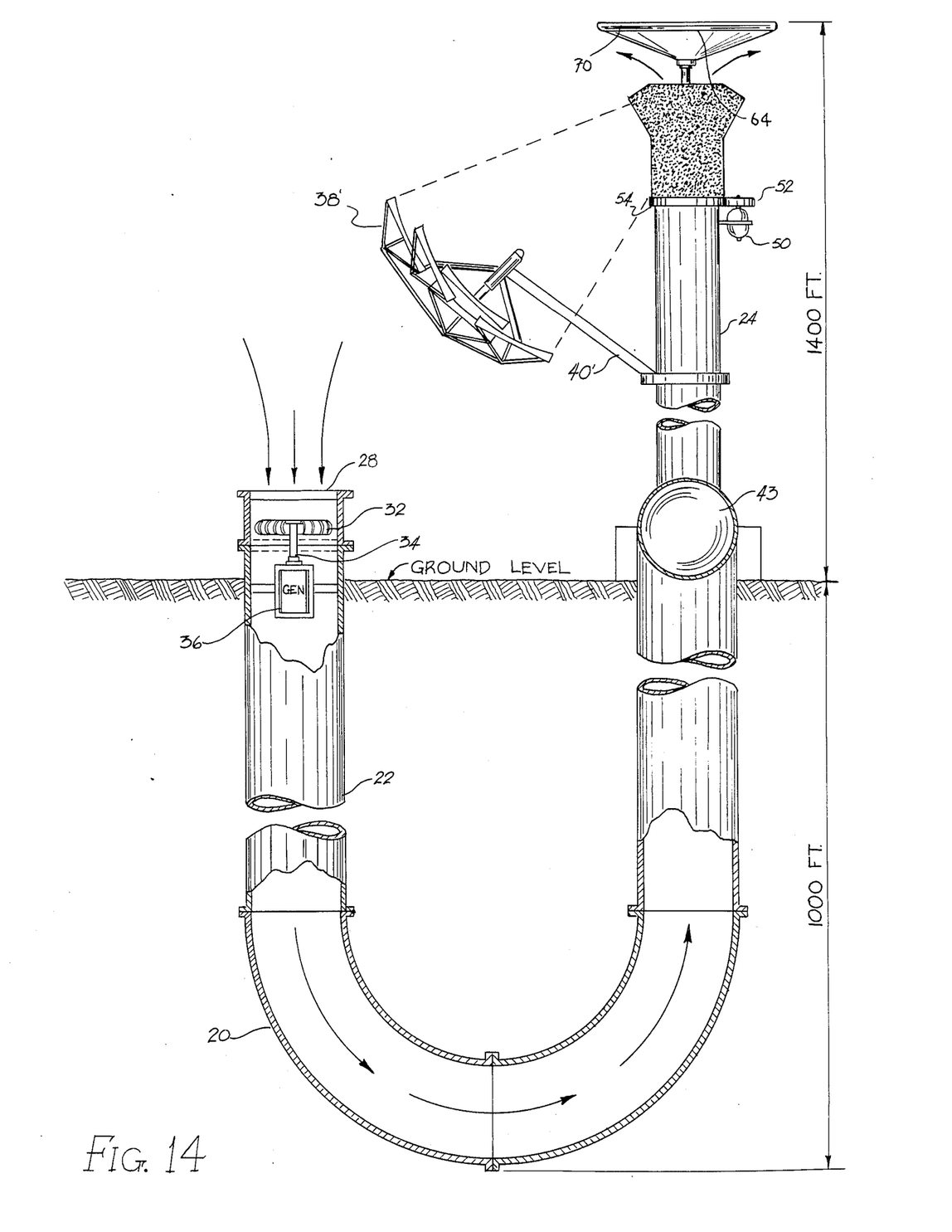
FIG. 14 is an elevation in partial section illustrating an alternative embodiment of a solar reflector; and, FIG. 15 is an isometric view illustrating still another arrangement of the present invention.

An alternative mounting arrangement for the solar reflector 38', wherein the solar reflector 38' is mounted by the support 40' to the exhaust portion 24 is illustrated in FIG. 14.

Figure 15:
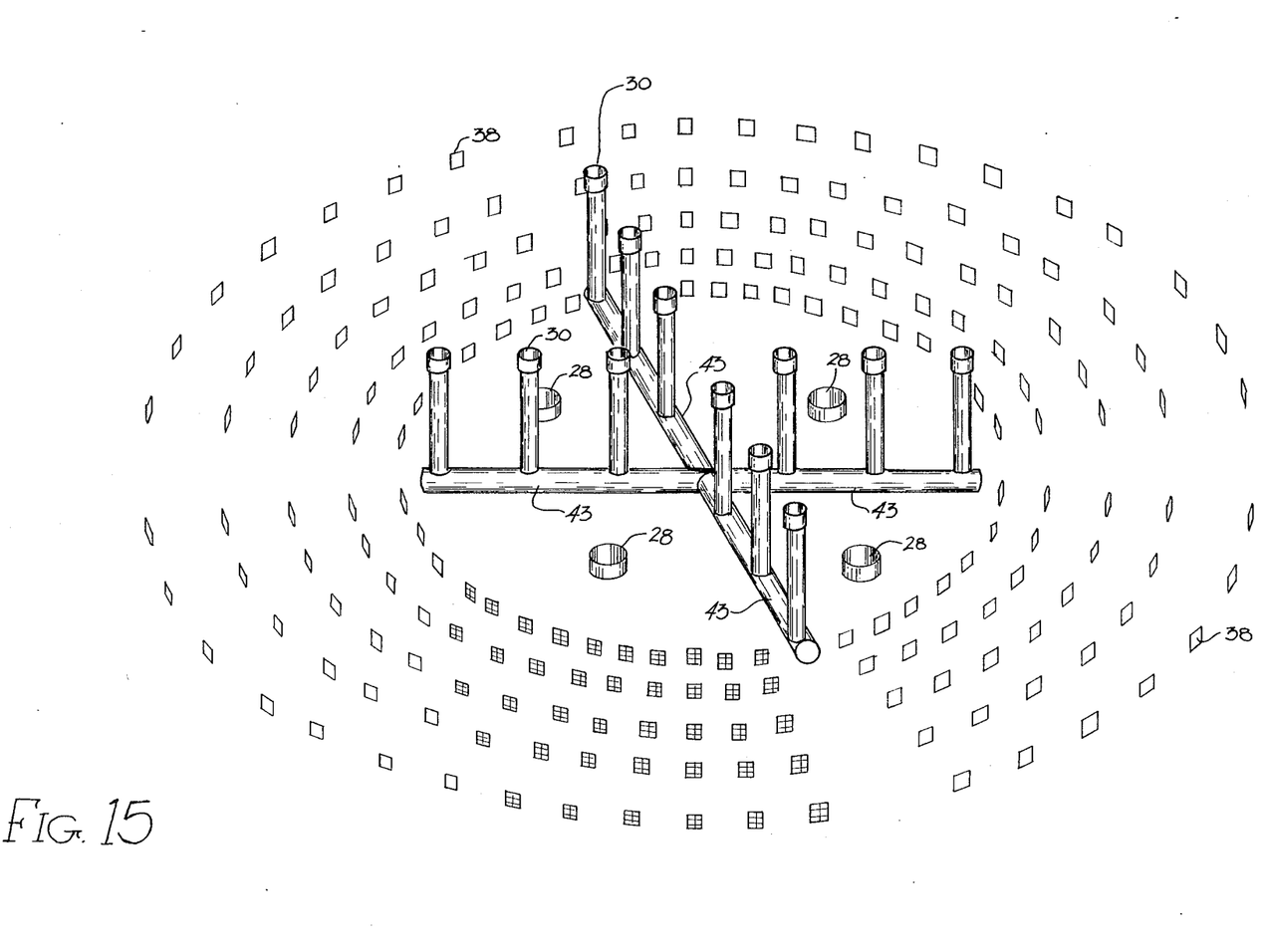

FIG. 15 illustrates an embodiment of the present invention wherein a bank of twelve exhaust portions 24 are interconnected by the manifolds 43 to four intake portions 22. According to the embodiment illustrated in FIG. 15, at least some of the solar reflectors 38 will be directing solar energy towards some of the exhaust portions 24 at all times during daylight, regardless of the particular position of the sun.

I claim:

1. A generating system for producing electrical energy, comprising:
    a stack shaped and positioned so as to be generally "J" shaped and having a intake portion, an exhaust portion and a conveying portion therebetween;
    means for causing air to move through said stack, said air moving means comprising a heat engine responsive to solar energy, said air moving means further including a wind-driven fan and an exhaust fan driven by said wind-driven fan; and
    means responsive to moving air for generating electricity.

2. The generating system of claim 1 including means for directing solar energy towards said heat engine.

3. The generating system of claim 1 wherein said heat engine comprises a substantially dark surface on said exhaust portion, said substantially dark surface on said exhaust portion absorbing solar energy to heat air within said exhaust portion, said exhaust portion causing said heated air to be exhausted therefrom.

4. The generating system of claim 1 including means for introducing moisture to said moving air.

5. The generating system of claim 1 wherein said conveying portion is substantially entirely buried in the ground, said intake portion is disposed substantially at the level of the ground, and said exhaust portion is disposed substantially above the level of the ground.

6. The generating system of claim 5 wherein said electricity generating means is disposed in said intake portion and said air moving means is associated with said exhaust portion.

7. The generating system of claim 1 wherein the diameter of at least a part of said conveying portion is less than the diameter of said intake portion and said exhaust portion.

8. The generating system of claim 1 wherein said stack comprises a plurality of said exhaust portions coupled to said conveying portion by a common manifold.

9. A generating system for converting solar energy to electrical energy, comprising:
    a stack shaped and positioned so as to be generally "J" shaped and having an exhaust portion, an intake portion and a conveying portion, said conveying portion having a segment with a diameter less than the diameter of said intake portion and said exhaust portion;
    a heat engine associated with said exhaust portion and having a rotatable heat transfer and distribution blanket, said heat engine being adapted to cause air to move through said stack;
    means for directly solar energy towards said heat transfer and distribution blanket; and
    a fan located at said intake portion and coupled to an electrical generator, said fan being adapted to rotate in response to movement of air through said stack, said rotation of said fan rotating said electrical generator, thereby causing said electrical generator to generate said electrical energy.

10. The generating system of claim 9 wherein said stack comprises a plurality of exhaust portions coupled to said conveying portion by a manifold.

11. The generating system of claim 9 including means for introducing moisture to said moving air.

12. The generating system of claim 9 including an exhaust fan located in said exhaust portion and a wind driven fan located outside said exhaust portion for driving said exhaust fan.

13. The generating system of claim 9 wherein said conveying portion is substantially buried in the ground.

14. The generating system for producing electrical energy, comprising:
    a stack shaped and positioned so as to be generally "J" shaped and having an intake portion, an exhaust portion and a conveying portion therebetween;
    means for causing air to move through said stack, said air moving means comprising a heat engine responsive to solar energy, said heat engine including an exhaust fan adapted to rotate within said exhaust portion; and
    means responsive to moving air for generating electricity.

15. The generating system of claim 14 wherein said exhaust fan is driven by a Stirling engine.

16. The generating system of claim 14 wherein said exhaust fan is driven by a solar activated turbo jet engine.

17. The generating system of claim 14 including means associated with said exhaust fan for maintaining rotation at a substantially constant velocity during variations in the level of solar energy.

18. The generating system of claim 17 wherein said rotation maintaining means comprises a variable mass flywheel.

19. The generating system for producing electrical energy, comprising:
    a stack shaped and position so as to be generally "J" shaped and having an intake portion, an exhaust portion and a conveying portion therebetween;
    means for causing air to move through said stack, said air moving means comprising a heat engine responsive to solar energy, said heat engine including a rotatable heat transfer and distribution blanket for uniformly distributing solar energy entirely about said heat engine; and
    means responsive to moving air for generating electricity.

20. The generating system of claim 19 wherein said heat engine includes an exhaust fan adapted to rotate within said exhaust portion, said exhaust fan being driven by a Stirling engine.

21. The generating system of claim 19 wherein said heat engine includes an exhaust fan adapted to rotate within said exhaust portion, said exhaust fan being driven by a solar activated turbojet engine.

22. The generating system as defined by claim 19 wherein said heat engine includes an exhaust fan adapted to rotate within said exhaust portion, and including means associated with said exhaust fan for maintaining rotation at a substantially constant velocity during variations in the level of solar energy.

* * * * *